(12) United States Patent
Chesnokov et al.

(10) Patent No.: US 11,200,647 B2
(45) Date of Patent: Dec. 14, 2021

(54) IMAGE PROCESSING

(71) Applicant: Apical Limited, Cambridge (GB)

(72) Inventors: Viacheslav Chesnokov, Cambridge (GB); Alex Kornienko, Cambridge (GB); David Hanwell, Cambridge (GB); Dumidu Sanjaya Talagala, Cambridge (GB)

(73) Assignee: Apical Limited, Cambridge (GB)

(*) Notice: Subject to any disclaimer, the term of this patent is extended or adjusted under 35 U.S.C. 154(b) by 154 days.

(21) Appl. No.: 16/591,101

(22) Filed: Oct. 2, 2019

(65) Prior Publication Data

US 2020/0134794 A1  Apr. 30, 2020

(30) Foreign Application Priority Data

Oct. 24, 2018 (GB) ..................... 1817317

(51) Int. Cl.
  *G06T 5/00* (2006.01)
  *H04N 5/243* (2006.01)
  *H04N 9/73* (2006.01)

(52) U.S. Cl.
  CPC ............ *G06T 5/009* (2013.01); *G06T 5/008* (2013.01); *H04N 5/243* (2013.01); *H04N 9/73* (2013.01); *G06T 2207/20208* (2013.01)

(58) Field of Classification Search
  CPC ............ G06T 5/009; G06T 5/008; G06T 2207/20208; H04N 5/243; H04N 9/73

USPC .......................................................... 382/274
  See application file for complete search history.

(56) References Cited

U.S. PATENT DOCUMENTS

| | | | |
|---|---|---|---|
| 2010/0157047 A1* | 6/2010 | Larkin | H04N 9/3191 348/135 |
| 2013/0322753 A1 | 12/2013 | Lim et al. | |
| 2015/0070537 A1* | 3/2015 | Bai | H04N 1/60 348/251 |
| 2015/0146038 A1* | 5/2015 | Donohoe | H04N 9/045 348/225.1 |
| 2017/0272690 A1* | 9/2017 | Seifi | G06T 5/009 |

OTHER PUBLICATIONS

United Kingdom Combined Search and Examination Report dated Apr. 18, 2019 for GB Application No. 1817317.9.

* cited by examiner

*Primary Examiner* — Michael R Neff
(74) *Attorney, Agent, or Firm* — EIP US LLP (57) ABSTRACT

A method, processor and system of retaining dynamic range. The method comprises obtaining a vignetting correction mesh for image data. The method also comprises generating an intensity compression curve, the intensity compression curve comprising one or more segments, based on the vignetting correction mesh; and adjusting pixel values of a portion of the image data according to the intensity compression curve and vignetting correction mesh.

14 Claims, 5 Drawing Sheets

Fig. 1

| 210 | | | | | | | |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

| 1.3 | 1.64 | 1.85 | 1.98 | 1.98 | 1.85 | 1.64 | 1.3 |
|---|---|---|---|---|---|---|---|
| 1.64 | 1.64 | 1.85 | 1.85 | 1.85 | 1.85 | 1.64 | 1.64 |
| 1.85 | 1.85 | 1.3 | 1.64 | 1.64 | 1.3 | 1.85 | 1.85 |
| 1.98 | 1.85 | 1.64 | 1 | 1 | 1.64 | 1.85 | 1.98 |
| 1.98 | 1.85 | 1.64 | 1 | 1 | 1.64 | 1.85 | 1.98 |
| 1.85 | 1.85 | 1.3 | 1.64 | 1.64 | 1.3 | 1.85 | 1.85 |
| 1.64 | 1.64 | 1.85 | 1.85 | 1.85 | 1.85 | 1.64 | 1.64 |
| 1.3 | 1.64 | 1.85 | 1.98 | 1.98 | 1.85 | 1.64 | 1.3 |

IMAGE PROCESSING

CROSS-REFERENCE TO RELATED APPLICATIONS

This application claims the benefit under 35 U.S.C. § 119(a) and 37 CFR § 1.55 to United Kingdom patent application no. GB 1817317.9 filed on Oct. 24, 2018 the entire content of which is incorporated herein by reference.

BACKGROUND OF THE INVENTION

Field of the Invention

The present invention relates to methods and apparatus for processing image data.

Description of the Related Technology

Image sensors are typically capable of capturing an image of a scene with a smaller dynamic range than that perceivable by the human visual system, where the dynamic range is for example the ratio between the pixel intensities of the brightest and darkest pixels within an image. For example, the human eye can perceive a dynamic range in excess of 55 dB, whereas image sensors may have a dynamic range of between 35 dB and 45 dB. The quality of images of high dynamic range scenes, such as outdoor scenes with motion, or nighttime scenes with bright lights, may therefore be reduced in images captured by image sensors when compared with the perception of such scenes by a human in real-time. Furthermore, the structures of the imaging system, such as the lens system can cause a gradual fall-off of light away from the center of the image.

SUMMARY

According to a first aspect of the present disclosure, there is provided a method of retaining dynamic range, the method comprising the steps of obtaining a vignetting correction mesh for image data; generating an intensity compression curve, the intensity compression curve comprising one or more segments, based on the vignetting correction mesh; and adjusting pixel values of a portion of the image data according to the intensity compression curve and the vignetting correction mesh.

According to a second aspect of the present disclosure, there is provided a processor for retaining dynamic range, the processor comprising: a generation module for generating a vignetting correction mesh, and an intensity compression curve for input image data; and an adjustment module for adjusting pixel values of the input image data according to the vignetting correction mesh and intensity compression curve, wherein the intensity compression curve is based on the local maximum intensity level and the vignetting correction mesh.

According to a third aspect of the present disclosure, there is provided an image processing system comprising: storage for storing image data representative of at least a portion of image data; a dynamic range adjustment system operable to: process the portion of the image data; obtain a vignetting correction mesh, local maximum intensity level and intensity compression curve for said portion; apply the vignetting correction mesh to the portion of image data; and adjust pixel values of the portion of image data according to the vignetting correction mesh and intensity compression curve, wherein the intensity compression curve is based on the local maximum intensity level and the vignetting correction mesh.

According to a fourth aspect of the present disclosure, there is provided a non-transitory computer-readable storage medium comprising a set of computer-readable instructions stored thereon which, when executed by at least one processor, cause the at least one processor to retain dynamic range of image data, the instructions comprising: obtaining a vignetting correction mesh for the image data; generating an intensity compression curve, the intensity compression curve comprising one or more segments, based on the vignetting correction mesh; and adjusting pixel values of a portion of the image data according to the intensity compression curve and vignetting correction mesh.

BRIEF DESCRIPTION OF THE DRAWINGS

Further features and advantages of the invention will become apparent from the following description, given by way of example only, which is made with reference to the accompanying drawings in which like reference numerals are used to denote like features.

DETAILED DESCRIPTION OF CERTAIN INVENTIVE EMBODIMENTS

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one examples but not necessarily in other examples. It should be further noted that certain examples are described schematically with certain feature omitted and/or necessarily simplified for the ease of explanation and understanding of the concepts underlying the examples.

Figure 1:
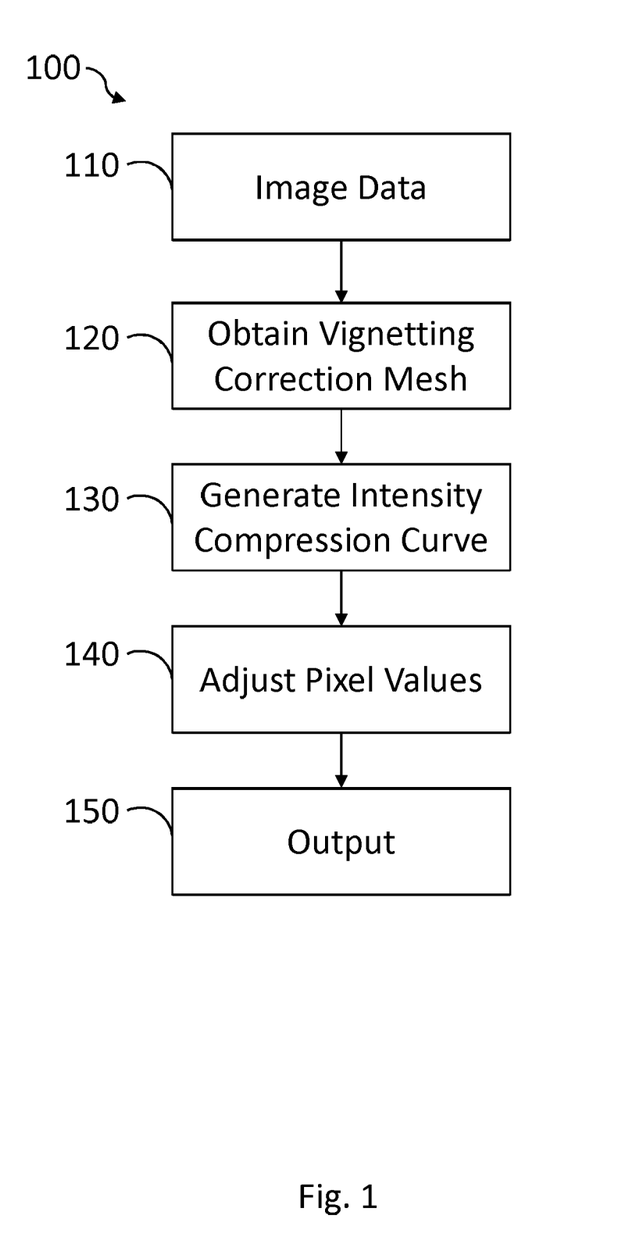
FIG. 1 shows is a flow diagram showing a method for processing image data according to examples.

FIG. 1 shows schematically a method 100 of processing image data 110 according to examples. The image data 110 is representative of at least a portion of an image and may be captured using an image sensor. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide semiconductor (CMOS). An exposure typically sets the time period over which light is captured by each sensor pixel of the image sensor and/or the gain applied by an amplifier to the electrical signal generated by each sensor pixel. The sensitivity of an image sensor to incident light is therefore generally determined by the exposure. In the example of FIG. 1, the image sensor may be arranged to capture the image data 110 using a single exposure. For example, all the sensor pixels of the image sensor may capture light during the same time period or during a time period of the same length as each other. However, in other examples, an image sensor for use with examples described herein may be a multi-exposure image sensor, which is arranged to capture the image data 110 using sensor pixels with at least two different exposures.

The image data 110, for example, may represent at least one characteristic of the light captured by an image sensor. The image data 110 may be representative of an intensity of the light captured by each sensor pixel, which may be proportional to the number of photons captured by each sensor pixel. The intensity may represent a luminance of the captured light, which is for example a measure of the intensity of light per unit area rather than an absolute intensity. In other examples, the image data 110 may be representative of a brightness of captured light, which may be considered to correspond to a perception of a luminance, which may or may not be proportional to the luminance. In general, the image data 110 may represent any photometric quality or characteristic that may be used to represent the visual appearance of the image represented by the image data 110. The image data 110 may be in any suitable format, such as raw image format. For example, the image data 110 may be streamed from the image sensor with or without being saved to a frame buffer, without saving the raw image data to a file. In such cases, image data 110 obtained after processing of the raw image data may, however, be saved to a file.

In some examples, the image sensor may include a colour filter array that includes a pattern of colour filter elements. Colour filter elements correspond to respective sensor pixels of an array of sensor pixels of the image sensor. For example, the colour filter array may be considered to form a mosaic or repeating pattern. A colour filter element generally allows light of a particular colour to pass through to the corresponding sensor pixel. In this way, the colour filter array allows different sensor pixels of the array of sensor pixels to receive different colours of incident light, allowing a full colour image to be captured. As typical photosensors are not sensitive to the wavelength of incoming light, typical sensor pixels would be unable to provide colour information from the detected light without a colour filter array. However, by separating incoming light into different wavelength ranges, corresponding to different colours using the colour filter array, the intensity of light in these different wavelength ranges can be ascertained, allowing this colour information to be determined.

It is to be appreciated that a colour may refer to any range of wavelengths of light. For example, a clear, transparent, or white colour filter element may nevertheless be considered to be a colour filter element in the sense that the colour filter element allows these particular wavelengths (such as all or substantially all) wavelengths in the visible spectrum to be transmitted to the underlying sensor pixel. In other examples, some or all of the colour filter elements may be non-white colour filter elements.

A pattern of colour filter elements may be formed of repeating groups of colour filter elements. A group of colour filter elements may, for example, include a red colour filter element, a blue colour filter element, and two green colour filter elements. The colour filter array may therefore correspond to a Bayer pattern, although other groups are possible in other examples. Each group may correspond with the necessary sensor pixels to obtain a full-colour image of a suitable quality. An example of image data 110 captured by a sensor using this arrangement of filters is shown in FIG. 2.

Figure 2:
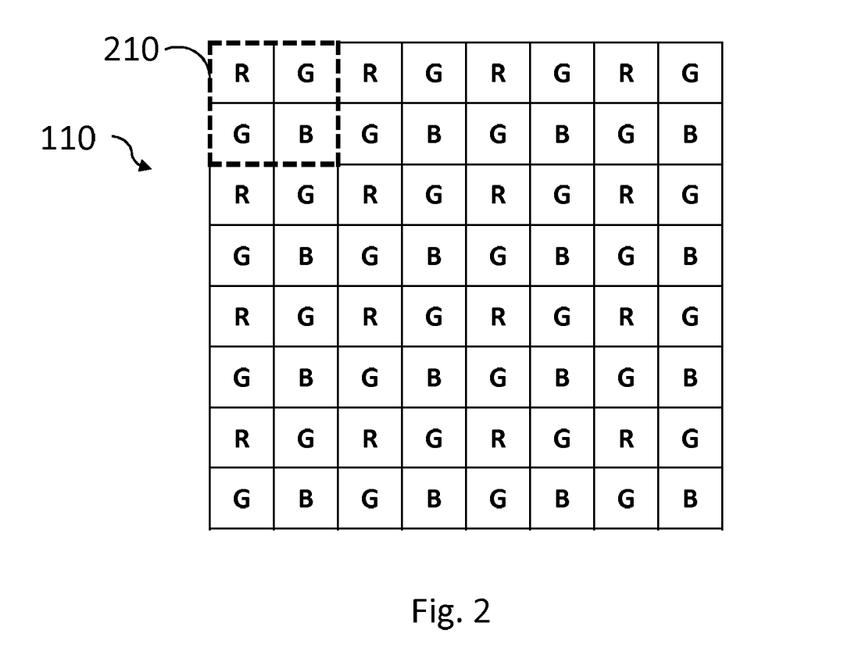
FIG. 2 is a representation of image data according to examples.

The image data 110 of FIG. 2 comprises a first set of pixels associated with a first colour channel, which in this example is green, a second set of pixels associated with a second colour channel, which in this example is red, and a third set of pixels associated with a third colour channel, which in this example is blue. Pixels of the first set of pixels are labeled with a 'G', pixels of the second set of pixels are labelled with an 'R', and pixels of the third set of pixels are labelled with a 'B'. In this example, the colour filter elements of the colour filter array, are arranged in a series of repeating groups, in a Bayer pattern (as described above). A Bayer pattern, or Bayer filter mosaic, and is obtained using an image sensor in combination with a color filter, where the filter elements are arranged in the Bayer pattern. The Bayer pattern includes repeating groups of filter elements comprising one blue filter element, two green filter elements, and one red filter element, as can be shown by region 210. Hence, an image obtained from an image sensor with a Bayer pattern of colour filter elements will have pixels which are also arranged in a Bayer pattern (which for example includes repeating groups of one blue pixel, two green pixels and one red pixel). Hence, in this example, each group includes two pixels of the first set of pixels, a pixel of the second set of pixels and a pixel of the third set of pixels. It will be appreciated that other filter arrangements may be used, such as a Red, Green, Blue, Emerald (RGBE) or Cyan, Yellow, Green, Magenta (CYGM) filter arrangements.

Referring back to FIG. 1, the method 100 involves processing image data 110 collected by an image sensor for extending the encodable dynamic range of the input scene's image data 110 by exploiting the effect of lens shading related to a lens system associated with the image sensor. Lens shading or vignetting may have a number of causes. For example, a physical obstruction may prevent light within the field of view from reaching the cameras image sensor. The physical obstruction may be caused by the lens barrel, a filter, a lens hood or anything else in the way, thereby preventing light from reaching the lens. Such physical obstructions cause a strong dark circular darkening apparent in the corners of an image. Other examples include optical vignetting which may be caused by light hitting the lens aperture at a strong angle. This effect may be noticed most often on images taken with wide angle and wide aperture lenses used with wide apertures. A further cause of lens shading is pixel vingetting, the image sensor which as explained above comprises a large number of pixels which measure/record the light hitting them also have a depth. This can also cause a vignetting effect when light does not hit the back of the pixel itself.

At item 120 of the method 100, a vignetting correction mesh is generated for the entirety of the image data 110, the correction mesh may be a pre-calibrated input that has been generated for a particular lens system or image sensor, for example. Alternatively, the correction mesh maybe generated in by a processor, such as the processor described below in relation to FIG. 7. The correction mesh is used to adjust the values of the pixels of the image data 110, for example to remove or reduce the effect of the lens shading. In one method the correction mesh may achieve this by multiplying the pixel values in the image data 110 by the inverse of the profile of brightness gradient. An exemplary vignetting correction mesh is shown in FIG. 3.

Figure 3:
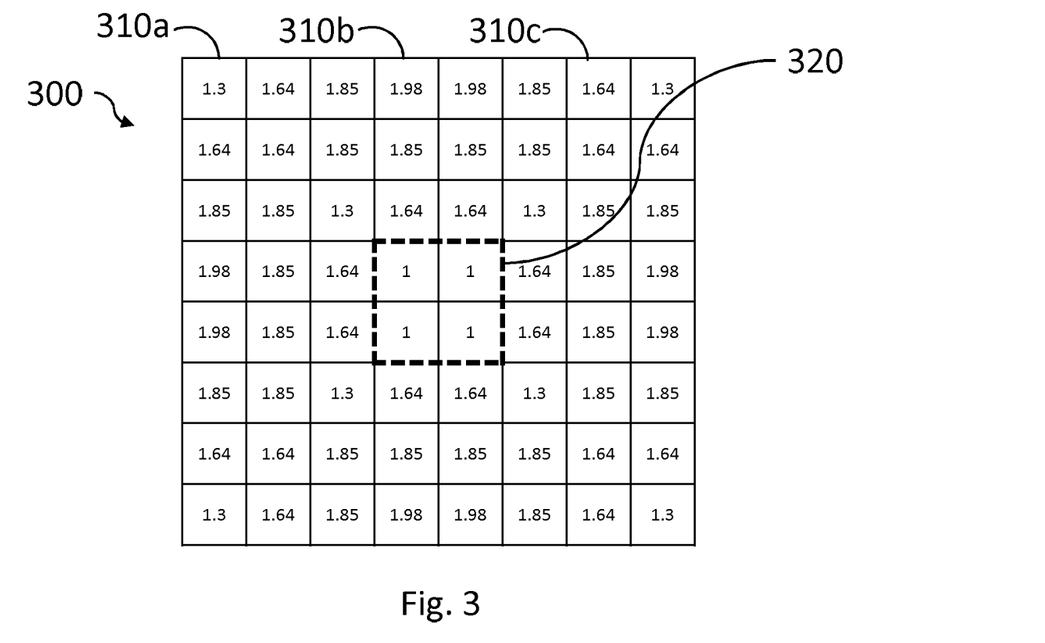
FIG. 3 is a representation of a vignetting correction mesh according to examples.

The vignetting correction mesh 300 of FIG. 3 comprises a plurality of regions 310a,310b,310c arranged in an array, the regions, 310a,310b,310c, are representative of pixels in the image data 110. Each region 310a,310b,310c comprises an adjustment value for adjusting the pixel values of the image data 110. In the example of FIG. 3, the values of each region are between 1 and 2, however it will be appreciated that in other examples, the regions may have values greater than 1. In this example, the closer the value to 1 the lower the effect the correction mesh will have on the pixel value, the closer to 2 the value the higher the effect the correction mesh will have on the pixel value. As can be seen in FIG. 3, the correction mesh has lower values towards the centre (as indicated by region 320), which, as explained above is in relation to the cause of lens shading and represents an area where the pixel values are least effected by vignetting.

The vignetting correction mesh may be a pre-calibrated input, for example a known correction mesh for a particular image sensor. Alternatively, the vignetting correction mesh may be generated by a processor, such as an image signal processor, as part of the method 100 of FIG. 1. To generate the vignetting correction mesh, in some embodiments, a flat field image under known lighting conditions may be captured and then inverted to generate a per colour channel vignetting correction mesh. In some embodiment, the appropriate white balance coefficients may then be computed and applied to the correction mesh to compute a single intensity mesh (effectively a white-balanced vignetting correction mesh) to combine the data from the different colour channels. This mesh may then be used to extend the dynamic range of an input scene that can be captured and retained in the output of the image signal processor. In some embodiments, a pre-calibrated vignetting correction mesh may be modified or replaced by software on a frame-by-frame basis.

Figure 6:
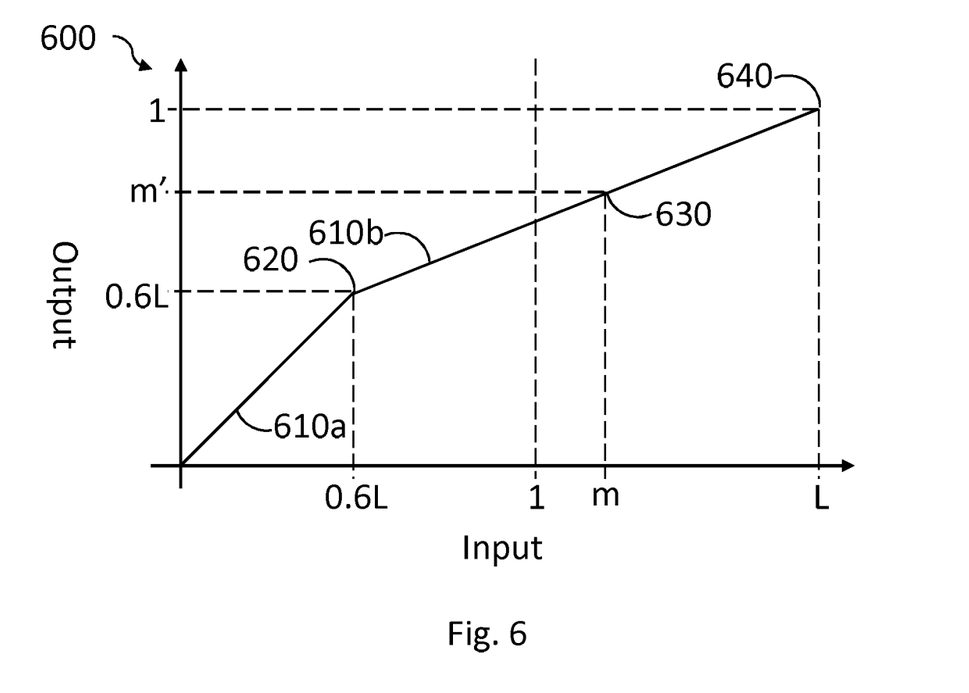
FIG. 6 is an intensity compression curve according to examples.

Returning to FIG. 1, at item 130 an intensity compression curve is generated. An example of such a curve is shown in FIG. 6 below. To generate the intensity compression curve, first a local maximum output intensity may be generated. To generate a local maximum output intensity, predetermined regions of the image data 110 are evaluated. Evaluating the regions may comprise applying a portion of the vignetting correction mesh, such as mesh 300 of FIG. 3, to a portion of the image data 110. An example of this is shown in FIG. 4.

Figure 4:
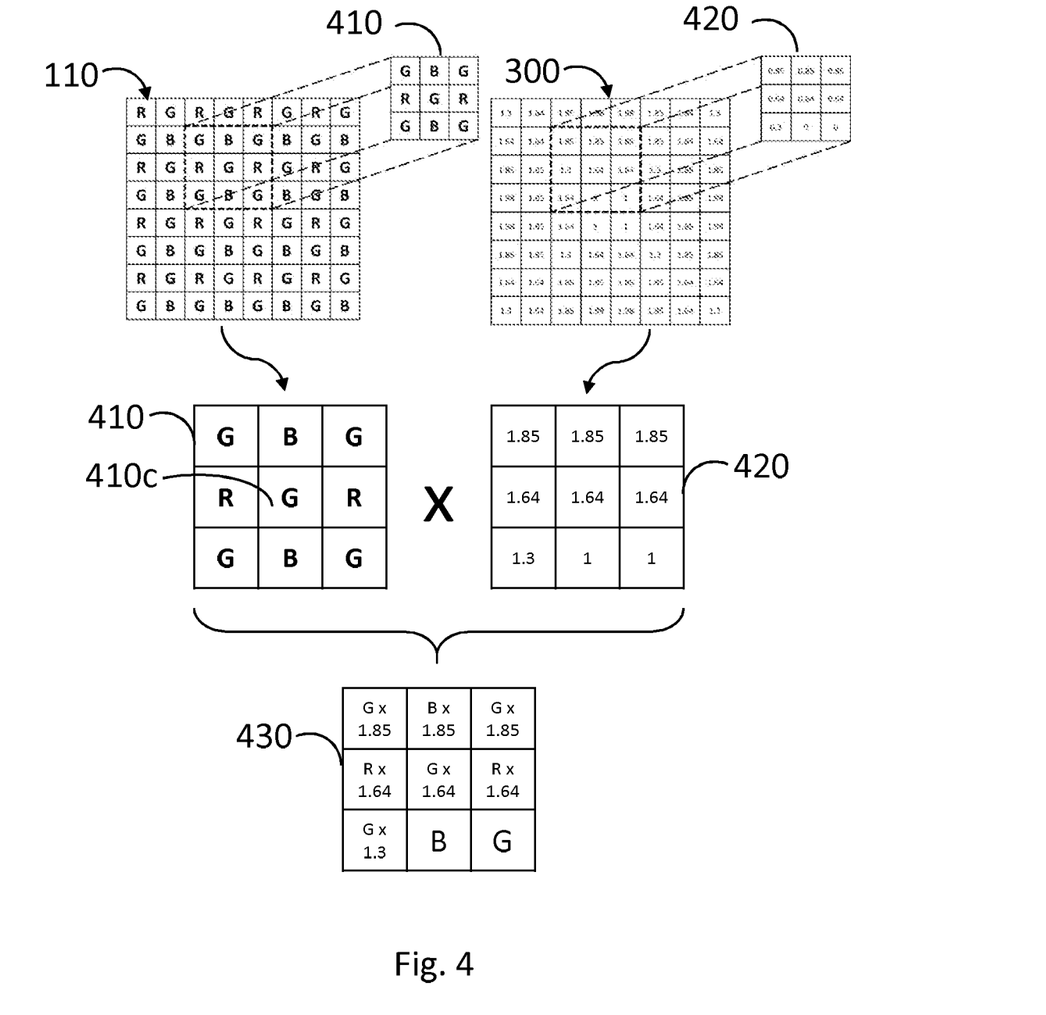
FIG. 4 is a representation of the application of a vignetting correction mesh to image data according to examples.

FIG. 4 shows the evaluation of an image portion 410 of the image data 110 combined with a corresponding correction portion 420 of a vignetting correction mesh 300. It will be appreciated in certain examples, that the correction portion 420 of the vignetting correction mesh 300 may not be a corresponding portion when compared to the image portion 410 of the image data 110.

As shown in FIG. 4, the image portion 410 and the correction portion 420 are combined to produce a corrected image portion 430. The corrected image portion 430 is representative of the local white level of a centre pixel 410c of the image portion 410. That is the local corrected image portion represents the maximum representable intensity for a point source at the centre pixel 410c.

Figure 5:
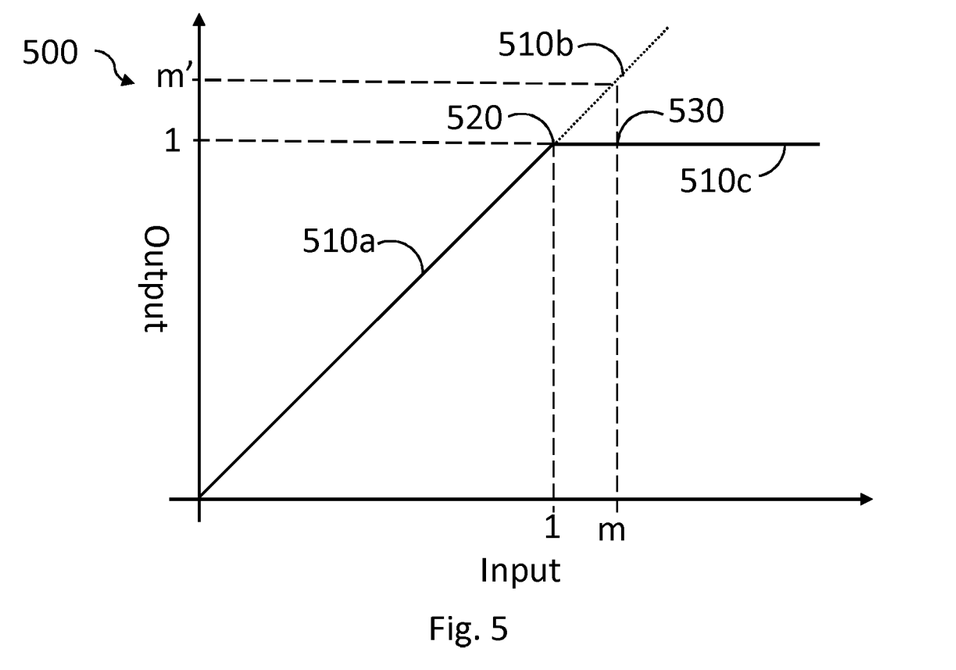
FIG. 5 is an intensity curve according to examples.

FIG. 5 shows an intensity curve 500 for image data, prior to an image processing method such as the image processing method 100 being applied. The intensity curve 500 shows a range of input values along the x-axis and a range of output values along a y-axis, where the output values are representative of an output of an image signal processor. The input values are representative of image data, such as image data 110, captured by an input device, such as an image sensor.

As shown in FIG. 5a, the input data and output data have a substantially linear relationship, as indicated at 510a, although it will be appreciated that, in some embodiments, the input and output data may have a substantially non-linear relationship. The input and output values may, in some examples extend beyond an output value of 1, where 1 is the maximum output. During the normalization process, any input values which generally map to an output of above 1, such as m, which maps to m', following the relationship indicated at 510b, may, in the standard image signal processor pipeline, be clipped back to 1. That is an input value of m, would be clipped to 1 as indicated by point 530. Thus, the relationship between input and output generally follows 510a, and 510c, where there is an inflexion point, or knee point at an output value of 1 represented by 520. A correction, such as that shown in FIG. 5, generally results in the loss of information present in the input image data everywhere, but at the very centre when compared to the input image data prior to any adjustments and/or corrections. As the image intensities are clipped back as shown in FIG. 5, this results in the clipping of highlights and therefore a loss of dynamic range that existed in the input image data. This may be scene dependent, and the retention in dynamic range of the input may only occur if this clipping occurs after vignetting correction. Methods, such as method 100 of FIG. 1 enable the input image data to retain its highest dynamic range content in the output of the image signal processor.

FIG. 6, shows an intensity compression curve 600 generated by the method 100 of FIG. 1, based on the combination of the image data 110 and vignetting correction mesh 300, described above.

The intensity compression curve 600 shows a range of input values along the x-axis and a range of output values along the y-axis, for example the output values may be representative of an output determined by an image signal processor. As explained above in relation to FIG. 5, the input values are representative of image data, such as image data 110, captured by an input device, such as an image sensor. The output values are representative of an output of a processor, such as an image signal processor.

The inputs shown in the intensity compression curve 600 represent the range of input values from 0 to the local white level, L, representative of the maximum representable intensity for a point source at a centre pixel, for example the centre pixel of a 3×3 region. The local white level L may be determined as described above in relation to FIG. 4. The local white level value L is mapped to an output value of 1, representative of the maximum output value of a processor as indicated at 640, such as an image signal processor. The intensity compression curve 600 may comprise a substantially linear section where the input values map to a corresponding output value, such that an input value equals the output value, as represented by a first section 610a of the intensity curve. The first segment/portion 610a continues to a predefined input value. For example, the first segment 610a is representative of input values between a first point (i.e. zero) and a second point 620. In some examples, such as the intensity compression curve 600 shown in FIG. 6, this the first segment 610a may be representative of 60% of the local white level L, and is preferably applicable to at least 50% of the input values, between zero and the local white level L. Although the first segment 610a of the intensity compression curve 600, may be applicable to any percentage of the input. It will be appreciated that the local white level, L, may be applicable to any portion of the image data, and in some embodiments may be dependent on the image sensor. Similarly, the first segment 610a need not be substantially linear but may be non-linear.

A second segment 610b of the intensity compression curve 600, represents the remainder of the input values, for example as shown in FIG. 6, the values between the second point 620 and the local white level L. However, it will be appreciated that in other examples, the first segment 610a and the second segment 610b may be representative of different ratios of the intensity compression curve 600.

The second portion 610b of the intensity compression curve 600 shows a mapping for values above the second point 620. These values are compressed, and/or scaled such that the highest value, that being the local white level L, maps to a maximum output, such as 1, as indicated by point 640, and the remaining values, those between the second point 620 and the local white level L are proportionally scaled so as to fit between the output value indicated by point 620 and an output value of 1. Whilst the second portion 610b depicted in FIG. 6 shows a generally linear section, it will be appreciated that the second portion 610b may be non-linear.

For example, an input at m, as mentioned above in relation to FIG. 5, would generally be clipped back to 1, therefore reducing the dynamic range of the input represented in the output. In the embodiment shown in FIG. 6, whereby a portion of the output is scaled and/or compressed, the output m would map to m' whereby m' is lower than 1. The input m would map to m' at point 630 via the second portion 610b intensity compression curve. Mapping values above the second point 620 such that they are translated to an output of 1 or below means that the highest dynamic range content of the image can be maintained across the image all the way to the output of the ISP, and not just substantially in the centre, as is the case with the example shown in FIG. 5.

Returning to FIG. 1, at item 140, the intensity compression curve, such as the curve 600 of FIG. 6 is used to adjust the pixel values of the input image data, such as image data 110, to produce an output where the input dynamic range encoded in the output has been adjusted spatially, such that the output data is representative of the full dynamic range of the input image data 110. This may be achieved by using the curve 600 to calculate an output value for a particular input value. For example, input value m, will be mapped to m' via the second portion 610b of the compression curve 600 via point 630.

At item 150 of FIG. 1, the adjusted pixel values are outputted. This may involve outputting the adjusted values to storage of a system, such as the system described below in relation to FIG. 8, or alternatively, the adjusted pixel values may be outputted to a display (not shown) for presentation to a user.

Figure 7:
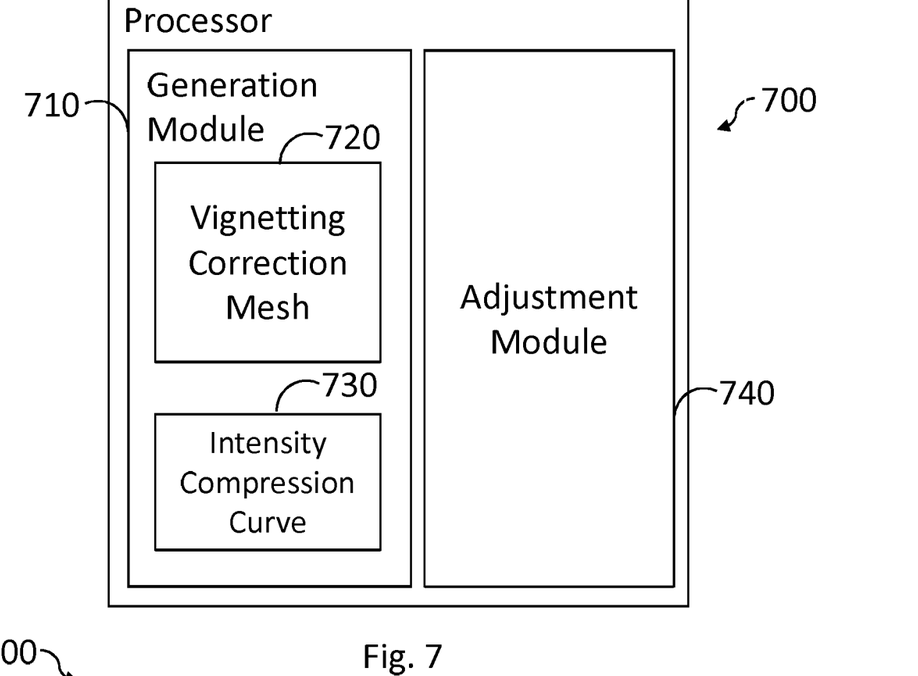
FIG. 7 is a processor for use in the image processing method shown in FIG. 1 according to examples.

FIG. 7 shows a processor 700 for use with a method of varying the input dynamic range of image data that is encoded in the output of the method, such as method 100 of FIG. 1. The processor 700 may be a central processing unit (CPU), image signal processor (ISP), a graphics processing unit (GPU), or alternative processors such as a microprocessor, a general-purpose processor, a digital signal processor (DSP), an application specific integrated circuit (ASIC), a field programmable gate array (FPGA), neural network accelerator (NNA), neural network processor (NNP), or other programmable logic device, a discrete gate or transistor logic, discrete hardware components, or any suitable combination thereof designed to perform the functions described herein.

The processor 700 comprises a generation module 710 for generating components for use in the adjustment of image data, such as image data 110. The generation module 110 comprise a vignetting correction mesh module 720 and an intensity compression curve calculation module 730.

The vignetting correction mesh module 720 generates/calculates a vignetting correction mesh, such as vignetting correction mesh 300 shown in FIG. 3, and applies it to image data 110, to produce an adjusted output 430 as shown in FIG. 4. Similarly, the intensity compression curve calculation module 730 generates an intensity compression curve, such as the intensity compression curve 600 shown in FIG. 6.

The components generated by the generation module 710, including the vignetting correction mesh, such as mesh 300, and the intensity correction curve, such as curve 600, are then processed in an adjustment module 740. The adjustment module 740 applies the intensity compression curve 600 to input image data, such as image data 110, and produces an output that extends the dynamic range of the input content that can be retained at the output.

Figure 8:
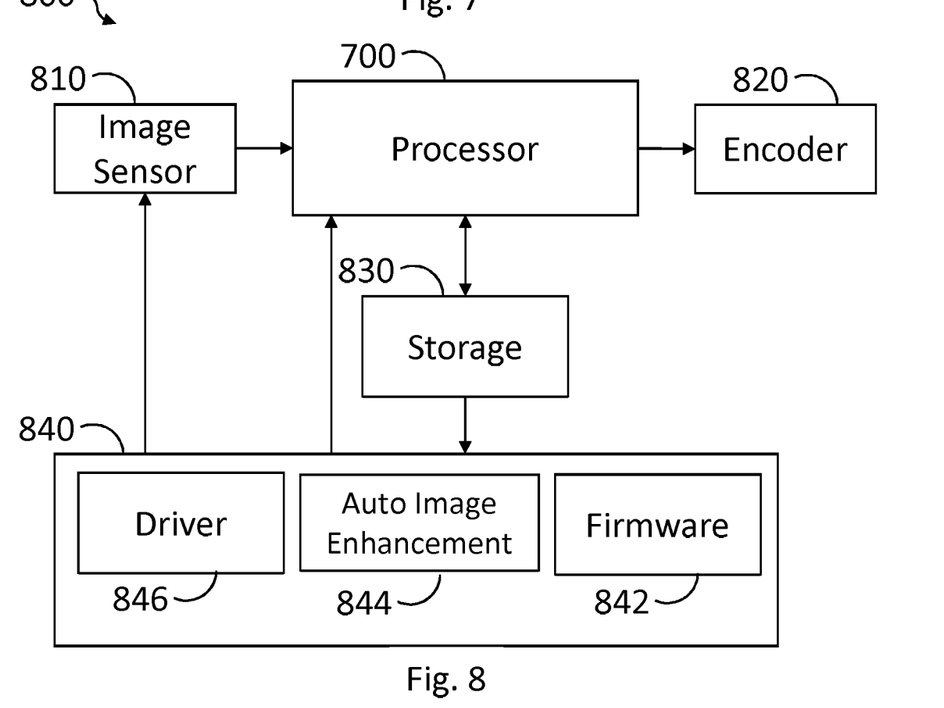
FIG. 8 is an image processing system according to examples.

The examples described herein may be implemented using an image processing system 800 such as that illustrated schematically in FIG. 8.

The image processing system 800 of FIG. 8 includes an image sensor 810, such as those described above. Light received at the image sensor 810 is converted to image data, such as image data 110. The image data is transferred to a processor 700, such as the processor 700 described above in relation to FIG. 7, which is typically configured to generate output image data representative of at least part of an output image. The output image data may be encoded via an encoder 820 before being transferred to other components (not shown), for example for storage or further processing. The processor 700 typically includes a number of modules or units that are configured to perform various processing on the image data, to generate the output image data, as described above. Processors such as the processor 700 of FIG. 8 may include a central processing unit (CPU), a graphics processing unit (GPU), an image signal processor (ISP), a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 700 in the example of FIG. 8 is arranged to perform a vignetting correction process to extend the dynamic range of input image data retained in the output, such as that described herein, and may therefore be considered to include an image processing system 800. Data for use in or generated as part of the image processing system 800 may be stored in storage 830 of the image processing system 800. The storage 830 may include at least one of volatile memory, such as a Random-Access Memory (RAM) and non-volatile memory, such as Read Only Memory (ROM) or a solid-state drive (SSD) such as Flash memory. The storage 830 is for example an on-chip memory or buffer that may be accessed relatively rapidly by the image signal processor 700. In other examples, though, the storage 830 may include further storage devices, for example magnetic, optical or tape media, compact disc (CD), digital versatile disc (DVD) or other data storage media. The storage 830 may be removable or non-removable from the image processing system 800. The storage 830 in FIG. 8 is communicatively coupled to the processor 700 so that data can be transferred between the storage 830 and the processor 700. For example, the storage 830 may store image data representative of at least a portion of an image, and the output data as described above.

The image processing system 800 of FIG. 8 also includes a controller 840 for controlling features or characteristics of the image sensor 810. The controller 840 may include hardware or software components or a combination of hardware and software. For example, the controller 840 may include firmware 842 which includes software for controlling the operation of the controller 840. The firmware 842 may be stored in non-volatile memory of the controller 840 or in the storage 830 (which is accessible to the controller 840). The controller 840 of FIG. 8 also includes an auto image enhancement system 850, which for example is configured to perform processing to determine whether adjustments need to be made to the image processing system 800 to improve the image quality. For example, the auto image enhancement system 844 may include an auto exposure module, an auto white balance module and/or an auto focus module. The controller 840 also includes a driver 846 for controlling the operation of the image sensor 810.

The vignetting correction process extending the dynamic range of image data that can be represented in the output, may be performed using hardware, such as hardware of the controller 840 or of the processor 700.

The order of processing steps in the examples described above are merely examples. In other examples, these processing steps may be performed in a different order.

It is to be understood that any feature described in relation to any one example may be used alone, or in combination with other features described, and may also be used in combination with one or more features of any other examples, or any combination of any other examples. Furthermore, equivalents and modifications not described above may also be employed without departing from the scope of the accompanying claims.

What is claimed is:

1. A method of retaining dynamic range, the method comprising the steps of:
    obtaining a vignetting correction mesh for image data;
    generating an intensity compression curve, the intensity compression curve based on the vignetting correction mesh, wherein the intensity compression curve comprises at least a linear segment, whereby a given input value maps to a corresponding output value, and wherein the linear segment is applied to a majority of the image data; and
    adjusting pixel values of a portion of the image data according to the intensity compression curve and the vignetting correction mesh.

2. The method of retaining dynamic range according to claim 1, wherein the vignetting correction mesh is a pre-calibrated input or based on an approximation used by an image signal processor.

3. The method of retaining dynamic range according to claim 1, wherein generating the vignetting correction mesh for the image data comprises using white balance information.

4. The method of retaining dynamic range of claim 1, wherein generating the intensity compression curve comprises generating a local intensity level in the portion of the image data using the correction mesh.

5. The method of retaining dynamic range according to claim 4, wherein the step of generating the intensity compression curve comprises determining when the local intensity level of the image is greater than a predetermined maximum output intensity.

6. The method of retaining dynamic range according to claim 5, wherein the predetermined maximum output intensity is the maximum output intensity of an image signal processor.

7. The method of retaining dynamic range according to claim 5, wherein generating the intensity compression curve comprises adjusting the maximum output intensity.

8. The method of retaining dynamic range according to claim 5, wherein:
    the intensity compression curve comprises a further portion whereby the given input value maps to an adjusted output value, the adjusted output value being below the maximum output intensity; and
    mapping the given input value to the adjusted output value comprises determining a gain to be applied to the given input value to map the actual output intensity to the adjusted output value, where the adjusted output value is between the upper threshold and the maximum output intensity.

9. The method of retaining dynamic range according to claim 1, comprising determining an upper threshold defining an upper value of the linear segment.

10. The method of retaining dynamic range according to claim 9, wherein the upper threshold is defined as a function of a proportion maximum output intensity.

11. The method of retaining dynamic range according to claim 1, comprising calculating an actual output intensity of a pixel after the application of the vignetting correction mesh.

12. A processor for retaining dynamic range, the processor comprising:
    an input module for obtaining a vignetting correction mesh for input image data;
    a generation module for generating an intensity compression curve for the input image data; and
    an adjustment module for adjusting pixel values of the input image data according to the vignetting correction mesh and intensity compression curve,
    wherein the intensity compression curve is based on the vignetting correction mesh, and comprises at least a linear segment, whereby a given input value maps to a corresponding output value, and wherein the linear segment is applied to a majority of the image data.

13. The processor for retaining dynamic range according to claim 12, wherein the processor is an image signal processor.

14. An image processing system comprising:
    storage for storing image data representative of at least a portion of image data;
    a dynamic range adjustment system operable to:
        obtain a vignetting correction mesh, for the image data;
    generate an intensity compression curve for for the image data based on the vignetting correction mesh;
        adjust pixel values of the portion of image data according to the vignetting correction mesh and intensity compression curve,
    wherein the intensity compression curve is based on the vignetting correction mesh, and comprises at least a linear segment, whereby a given input value maps to a corresponding output value, and wherein the linear segment is applied to a majority of the image data.

* * * * *